United States Patent [19]

Daikoku et al.

[11] Patent Number: 4,930,475
[45] Date of Patent: Jun. 5, 1990

[54] IDLING ROTATING SPEED CONTROL SYSTEM OF OUTBOARD ENGINE

[75] Inventors: Keisuke Daikoku; Kazuhiro Umehara, both of Shizuoka, Japan

[73] Assignee: Suzuki Jidosha Kogyo Kabushiki Kaisha, Shizuoka, Japan

[21] Appl. No.: 357,423

[22] Filed: May 25, 1989

[30] Foreign Application Priority Data

Aug. 31, 1988 [JP] Japan .................. 63-217959

[51] Int. Cl.$^5$ .............. F02M 51/00; F02D 41/16; F02D 9/02
[52] U.S. Cl. ............................ 123/339; 123/340; 123/406; 123/418
[58] Field of Search ........... 123/339, 443, 352, 340, 123/406, 418

[56] References Cited

U.S. PATENT DOCUMENTS

| | | | |
|---|---|---|---|
| 4,763,623 | 8/1988 | Sasaki | 123/339 |
| 4,779,591 | 10/1988 | Jordenmalum | 123/352 |
| 4,784,103 | 11/1988 | Ohishi | 123/339 |
| 4,856,475 | 8/1989 | Shimomura et al. | 123/339 |

Primary Examiner—Raymond A. Nelli
Attorney, Agent, or Firm—Flynn, Thiel, Boutell & Tanis

[57] ABSTRACT

A rotational speed control system for an engine includes controls for determining whether the throttle is closed beyond a predetermined position, whether the engine is mechanically loaded, and whether the engine rotational speed exceeds a predetermined speed. A control delays the ignition timing of the engine when the throttle is closed beyond the predetermined position, the engine is not mechanically loaded, and the rotational speed exceeds the predetermined speed.

6 Claims, 8 Drawing Sheets

IDLING ROTATING SPEED CONTROL SYSTEM OF OUTBOARD ENGINE

FIELD OF THE INVENTION

The present invention relates to an idling rotating speed control system for an outboard engine and, more particularly, to an idling rotating speed control system for allowing a shift from an idling mode to a trolling mode to be smoothly executed.

BACKGROUND OF THE INVENTION

In a small boat or the like to which an outboard engine is attached, trolling so as to silently sail without generating large waves near a bay shore or a fishing place is often executed.

Figure 7:
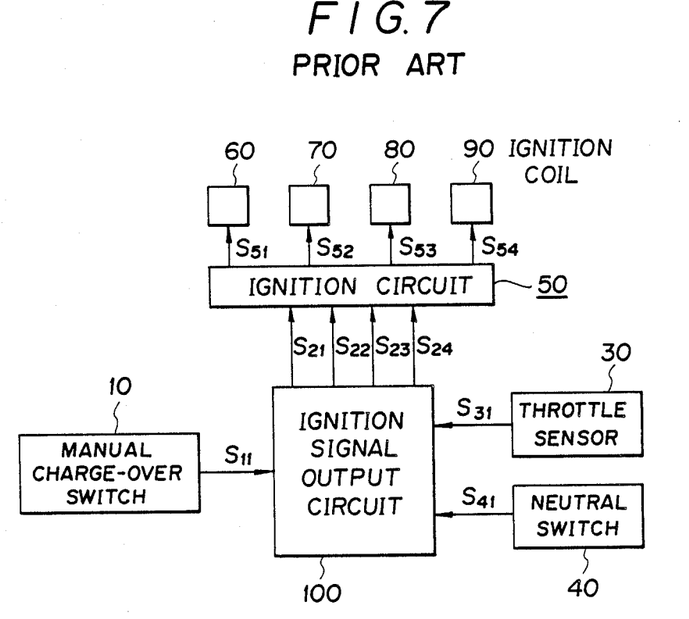
FIG. 7 is a block diagram of a conventional device.

FIG. 7 shows a conventional arrangement of a control for the engine. In the conventional arrangement of FIG. 7, an output signal of a manual change-over switch 10 which selects ignition timing in the trolling mode, an output signal of a throttle sensor 30 which represents a throttle opening degree or position, and an output signal of a neutral switch 40 are input to an ignition signal output circuit 100. An output of the ignition signal output circuit 100 is transferred though an ignition circuit 50 to ignition coils 60 to 90 of the engine.

Figure 8:
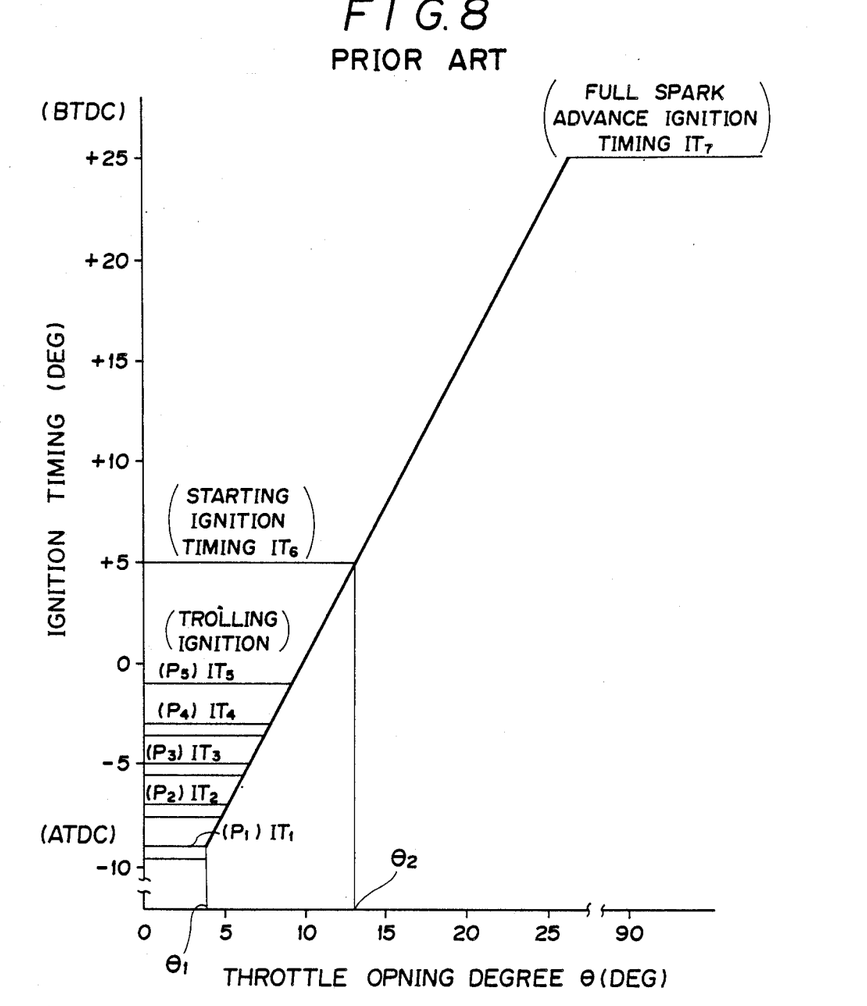
FIG. 8 is a diagram showing an ignition timing characteristic graph for the conventional device of FIG. 7.

In this case, upon starting of the engine, to improve the starting efficiency, as shown in FIG. 8, ignition is performed at a timing $IT_6$ at a throttle opening position $\theta_2$. When the engine is set to the idling mode, that is, the throttle is substantially fully closed and the engine is not engaged with any drive gear, the ignition is executed at one of the ignition timings which has previously been selected by the manual change-over switch 10, that is, timings $IT_1$ to $IT_5$. The engine rotating speeds are set in accordance with the order such that $IT_1 < IT_2 < IT_3 < IT_4 < IT_5$. When the drive gear to transfer the rotating force of the engine to the propeller is engaged, thereby initiating the trolling mode, the trolling sailing is executed at the engine rotating speed corresponding to the idling mode. Further, when the throttle opening degree is increased, as shown in FIG. 8, the ignition timing advances along a generally straight line. The ignition timing is saturated at a predetermined value, for instance $IT_7$, and becomes constant.

Since the load in the idling (i.e. neutral) mode, where the drive gear is disengaged, is smaller than that in the trolling mode, where the drive gear is engaged, the engine rotating speed in the idling mode is larger than that in the trolling mode. Therefore, during the transition from the idling mode to the trolling mode (when the gear is engaged), often a dog clutch is damaged or the shifting operation becomes impossible.

On the other hand, to prevent such an inconvenience, it is sufficient to reduce the engine rotating speed in the idling mode. However, in this case, there is a drawback in that when the gear is connected, the engine rotating speed becomes too low and engine stall occurs.

It is an object of the present invention to avoid such inconveniences of the conventional arrangement and to provide an idling rotating speed control system for an outboard engine in which the shock is small, particularly when shifting from the idling mode to the trolling mode, and in which the engine rotation is stable.

SUMMARY OF THE INVENTION

The present invention includes: a throttle sensor to monitor the throttle opening degree; a remote control box which performs opening and closing operations of a clutch and throttle and includes a neutral switch (for indicating whether the drive gear is engaged) for a mechanism which cannot be started except in the case where the clutch is set to the neutral mode; a manual change-over switch to select an ignition timing for the trolling mode; and an ignition circuit to send an ignition signal to an ignition coil of each cylinder. The invention also has a construction including: a rotating speed measuring device for measuring the engine rotating speed; and an ignition timing control circuit to send an ignition timing control signal to the ignition circuit on the basis of the throttle opening degree signal from the throttle sensor, a gear position signal from the neutral switch, and an engine rotating speed signal from the engine rotating speed measuring device.

The throttle opening degree signal from the throttle sensor, the gear position signal from the neutral switch, and the engine rotating speed signal from the engine rotating speed measuring device are sent to the ignition timing control circuit. In the ignition timing control circuit, only when the throttle is substantially fully closed and the gear is set in the neutral mode (disengaged) and, further, the engine rotating speed is larger than a preset value, then an ignition timing control signal to delay the ignition timing is sent to the ignition circuit. That is, only in the idling mode and only when the engine rotating speed is larger than the set value, then the ignition timing is delayed to thereby reduce the engine rotating speed.

BRIEF DESCRIPTION OF THE DRAWINGS

FIGS. 6(1) and 6(2) constitute a flowchart showing the operation of the circuit shown in FIG. 3;

DETAILED DESCRIPTION

An embodiment of the present invention will be described hereinbelow on the basis of FIGS. 1 to 6.

Figure 1:
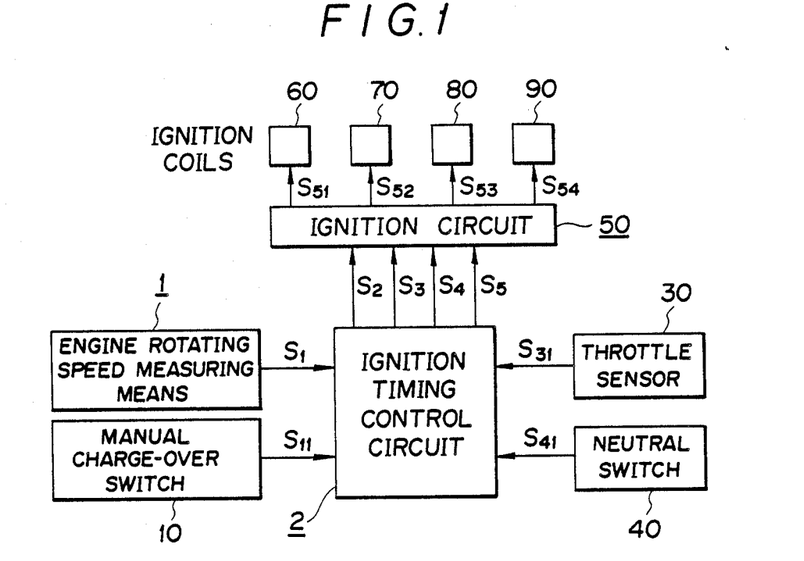
FIG. 1 is a block diagram showing an embodiment of the present invention.

In the embodiment of FIG. 1, an engine rotating speed signal $S_1$ from engine rotating speed measuring device 1 and a reference ignition timing signal $S_{11}$ from the manual change-over switch 10 for setting the ignition timing in the trolling mode are input to an ignition timing control circuit 2 which is controlled by a microcomputer. A throttle opening degree signal $S_{31}$ (representing the angle to which the engine's throttle is opened) from the throttle sensor 30 and a gear position signal $S_{41}$ from the neutral switch 40 in a remote control box are also input to the ignition timing control circuit 2. Ignition timing control signals $S_2$ to $S_5$ as outputs of the ignition timing control circuit 2 are input to the ignition circuit 50. Ignition signals $S_{51}$ to $S_{54}$ are output from the ignition circuit 50 to the ignition coils 60 to 90 of the respective cylinders of the engine.

Figure 2:
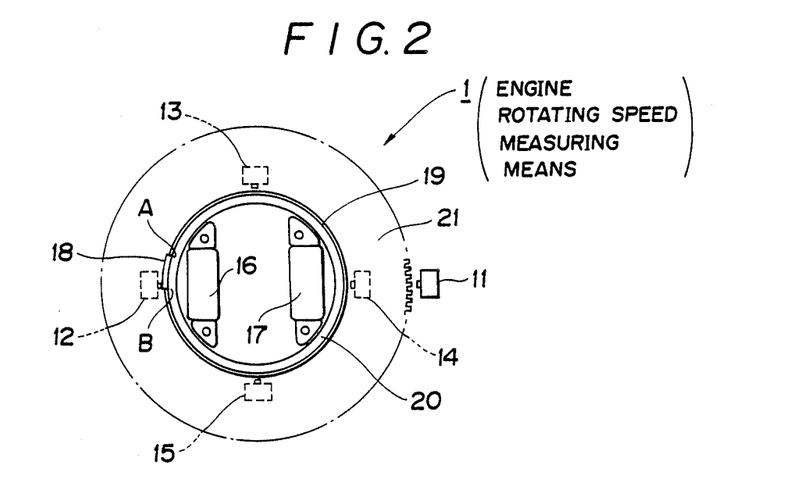
FIG. 2 is a constructional view showing an example of a magneto used as an engine rotating speed measuring means in FIG. 1.

The engine rotating speed measuring device 1 uses a magneto as shown in FIG. 2. The magneto is constructed in a manner such that a rotor 19 having a magnet 20 attached to its inside and a ring gear 21 attached to its outside and to an engine crank shaft (not shown). A trigger pole 18 is attached to the outside of the rotor 19. Pulser coils 12 to 15 are arranged at intervals of 90° so as to face the trigger pole 18. Further, a capacitor charging coil 16 and a microcomputer power supply coil 17 are arranged on the inside of the rotor 19. A gear counting coil 11 is arranged on the outside of the ring gear 21.

The engine rotating speed measuring device 1 is similar in structure and function to an apparatus described in U.S. Pat. Ser. No. 4 790 280, assigned to the assignee of the present invention, the disclosure of which is incorporated herein by reference.

Figure 3:
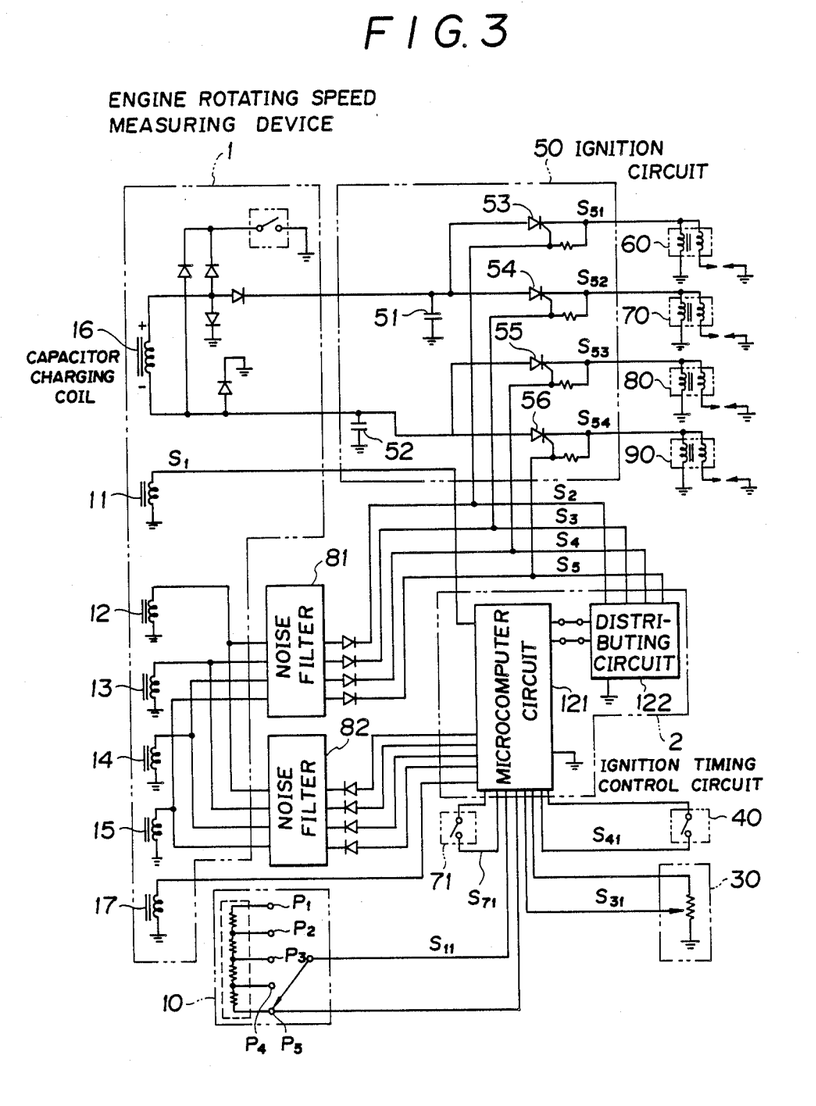
FIG. 3 is a detailed circuit diagram of the block diagram of FIG. 1.

As shown in FIG. 3, the ignition timing control circuit 2 uses electric power which is output from the microcomputer power supply coil 17 as a power source, and receives the engine rotating speed signal $S_1$ from the gear counting coil 11 of the engine rotating speed measuring device 1, the reference ignition timing signal $S_{11}$ from the manual change-over switch 10 to set the ignition timing in the trolling mode, the throttle opening degree signal $S_{31}$ from the throttle sensor 30, a gear position signal $S_{41}$ from the neutral switch 40, and an engine temperature signal $S_{71}$ from an engine temperature sensor 71. The ignition timing control circuit 2 includes: a microcomputer circuit 121 to output control signals to the pulser coils 12 to 15 through a noise filter 82 and to a distributing circuit 122; and the distributing circuit 122 to output the ignition timing control signals $S_2$ to $S_5$ to the ignition circuit 50 in response to an output of the microcomputer circuit 121.

The ignition circuit 50 includes: capacitors 51 and 52 to store an electric power generated by the capacitor charging coil 16; and thyristors 53 to 56 to supply the electric power stored in the capacitors 51 and 52 to the ignition coils 60 to 90 in response to the signals which are supplied from the pulser coils 12 to 15 through a noise filter 81.

The operation will now be described on the basis of FIGS. 2 to 5.

Figure 4:
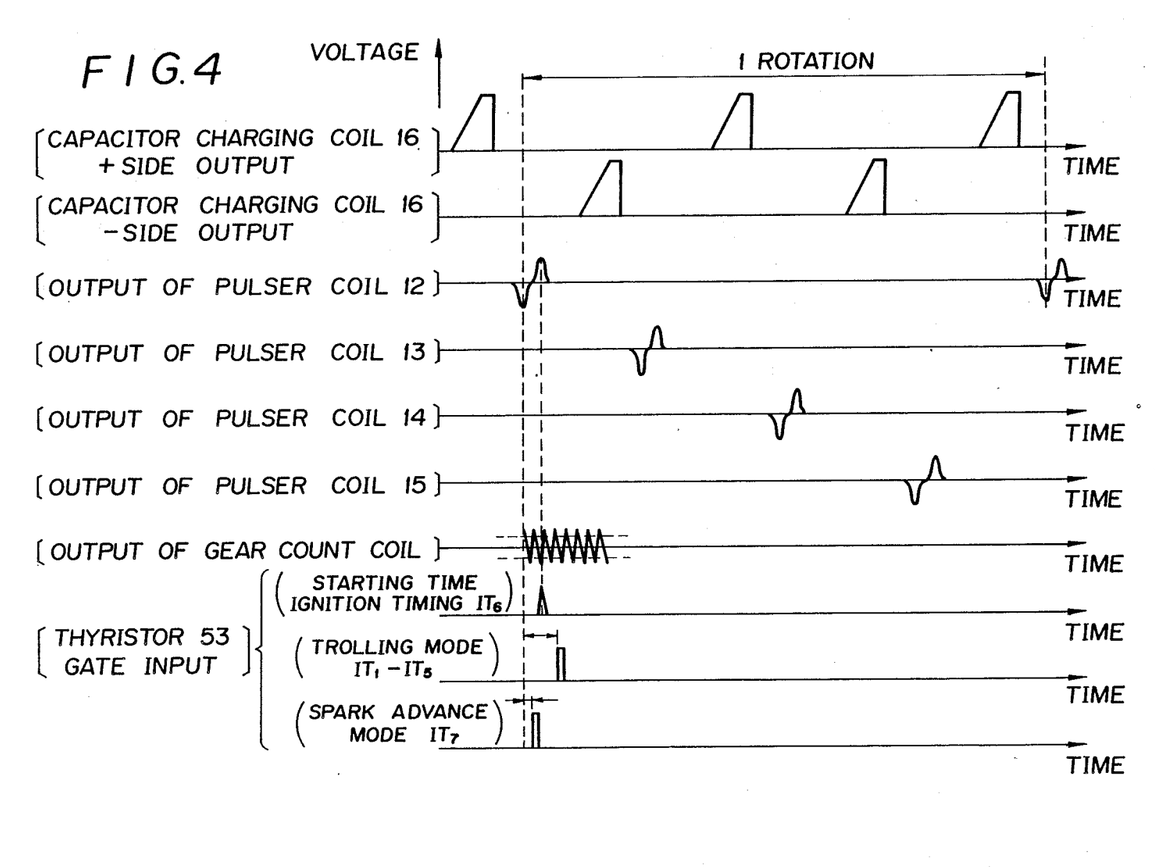
FIG. 4 is a graph showing the timing relationship between selected signal waveforms from the circuit shown in FIG. 3.

When the engine is started by a starter motor (not shown), a pinion gear (not shown) is brought into engagement with the ring gear 21, so that the rotor 19 begins to rotate. When the rotor 19 rotates, an electromotive force is generated in the capacitor charging coil 16. FIG. 4 shows output waveforms in this case. A predetermined electric power is stored into the capacitor 51 by an output on the positive (+) side of the capacitor charging coil 16, and a predetermined electric power is stored into the capacitor 52 by an output on the negative (−) side of the coil 16.

After the capacitor 51 was charged, when the edge surface of the trigger pole 18 faces the pulser coil 12, a negative polarity side output of the pulser coil 12 is generated and a current flows from the microcomputer circuit 121 to the noise filter 82. In this case, due to the control by the microcomputer circuit 121, according to such a signal, it is prevented that a signal is output to the distributing circuit 122 and subsequent circuit for a few seconds after the engine is started. When the rotor 19 further rotates and the other edge surface of the trigger pole 18 faces the pulser coil 12, a positive polarity side output of the output waveform of the pulser coil 12 is then generated. By this output, a current flows along the path of "the pulser coil 12 → the noise filter 81 → a gate of the thyristor 53 → a primary coil of the ignition coil 60". The thyristor 53 in the OFF state is turned "ON". The capacitor 51 is rapidly discharged such that current flows along the path of "the capacitor 51 → the thyristor 53 → the primary coil of the ignition coil 60". Due to this, a high voltage is generated on the secondary side of the ignition coil 60 and a spark is generated from a spark plug and the air-fuel mixture in the combustion chamber is fired. Thus, the engine is started. After that, sparks are successively generated from the other spark plugs by the same operation and the air-fuel mixture is fired. The ignition timing at this time (i.e. at start up) is set to the starting ignition timing $IT_6$ in FIG. 5. The starting ignition timing $IT_6$, as indicated by the gate input of thyristor 53 in FIG. 4, corresponds to the output of pulser coil 12.

The engine temperature sensor 71 attached to a cylinder head or a position near it is turned OFF when the engine temperature is a predetermined temperature or lower, and is turned ON when the engine temperature is the predetermined temperature or higher. When the engine temperature sensor 71 is turned OFF, it is considered that the engine is in the cooling state, and an operating time $T_1$ (seconds) at the starting timing is set in the microcomputer circuit 121. On the other hand, when the engine temperature sensor 71 is ON, it is considered that the engine is in the warming-up state, and an operating time $T_2$ (seconds) at the starting ignition timing is set in the microcomputer circuit 121. The relation between $T_1$ and $T_2$ is set to $T_1 > T_2$.

After the elapse of the starting ignition timing set time $T_1$ or $T_2$, the negative polarity side output of the pulser coil output waveform is started under the control by the microcomputer circuit 121. The gear counting coil 11 generates an output as shown in FIG. 4 and its frequency is counted by the microcomputer circuit 121. A signal corresponding to the ignition timing which has previously been set by the manual change-over switch 10 is output from the microcomputer circuit 121 to the distributing circuit 122, regardless of whether the engine is in the trolling mode or the idling mode.

Figure 5:
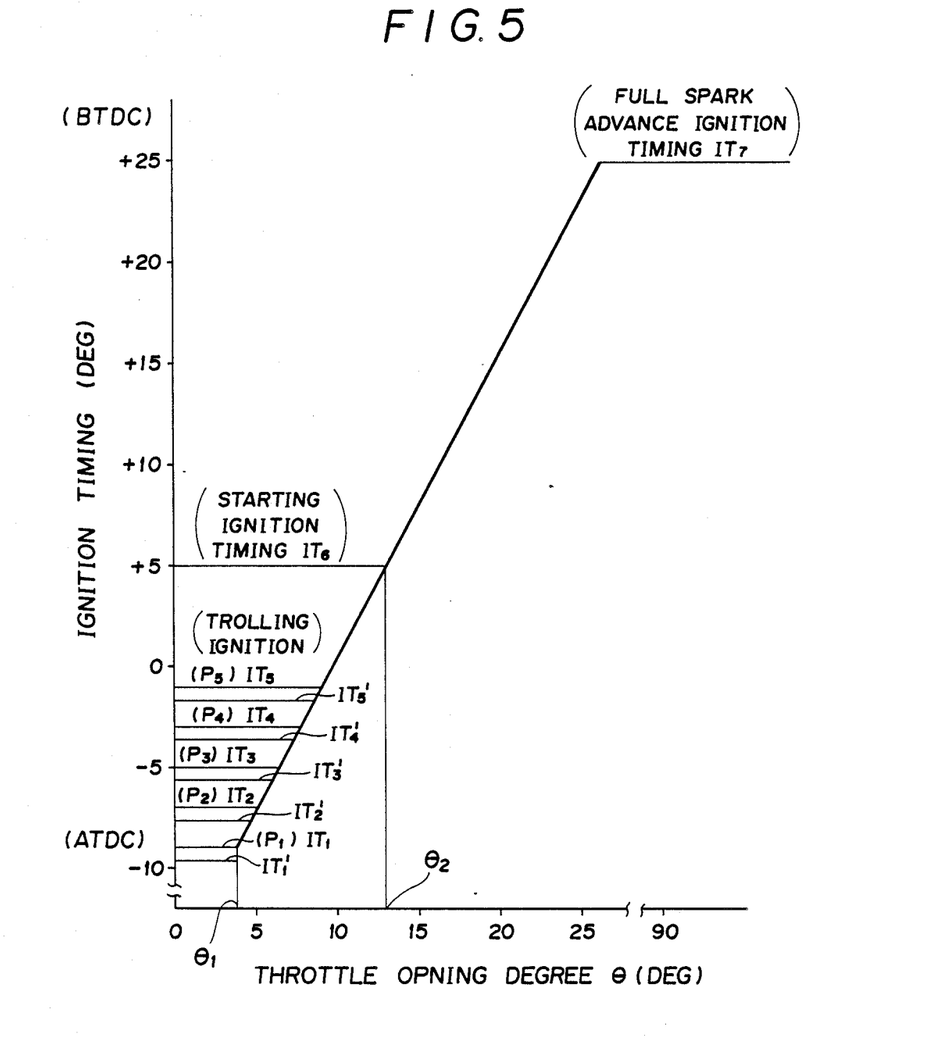
FIG. 5 is a characteristic diagram showing an ignition timing characteristic of the circuit shown in FIG. 3.
Figure 6:
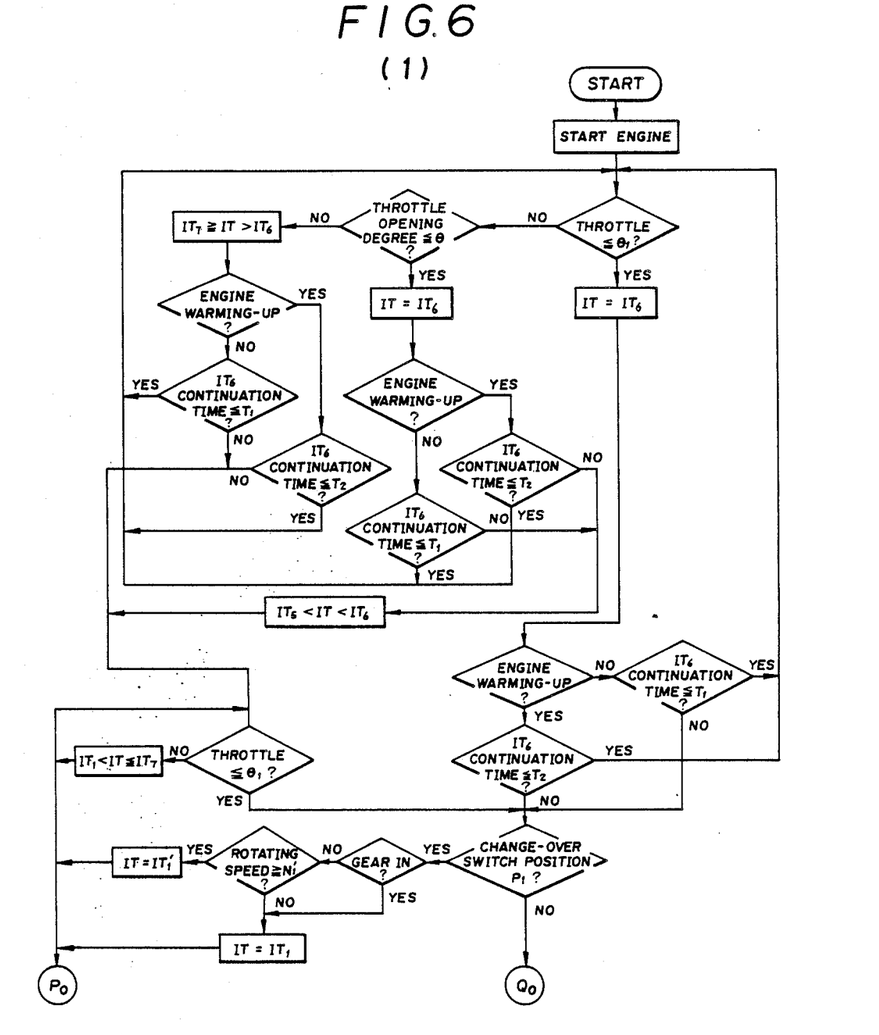

In the distributing circuit 122, a signal is output to the gate of the thyristor corresponding to the cylinder (and piston) which just comes to the ignition position at this time, thereby turning on the thyristor and finally generating a spark. In response to signals from the microcomputer circuit 121, signals are successively output from the distributing circuit 122 to the gates of the respective thyristors 53–56 for the engine cylinders. FIG. 4 shows an example of the output signal from the distributing circuit 122 which controls thyristor 53 for trolling mode ignition timing. The trolling mode ignition timings which are determined by the above operations are set to $IT_1$ to $IT_5$ as shown in FIG. 5. The setting of the timing at one of $IT_1$ to $IT_5$ is decided by selecting one of the positions $P_1$ to $P_5$ of the manual change-over switch 10 in FIG. 3.

In the idling mode, the throttle opening degree is $\theta_1$ or less (that is, the throttle is substantially closed), and the drive gear is OFF (disengaged) so that the load is obviously light. Thus the engine rotating speed increases. For instance, when the manual change-over switch 10 is set to $P_5$, the ignition timing in the trolling mode is $IT_5$. In this state, if the drive gear is turned off to set the idling mode, then an upper limit on the increasing engine rotating speed is set to $N_5'$. $N_5'$ has a value determined by adding an allowable increase of rotational speed and an error amount due to a variation in product (for example, manufacturing tolerance differences) to an objective (nominal) rotating speed in the trolling mode. The neutral switch 40 is provided to discriminate whether the drive gear is ON or OFF (engaged or disengaged). In the neutral mode, the neutral switch 40 is set to on, and in the mode other than the neutral mode, the switch 40 is turned off. In the case where the manual change-over switch 10 is selected to $P_5$, the neutral switch 40 is set to ON, the throttle opening degree is $\theta_1$ or less, and the engine rotating speed is $N_5'$ or more, the ignition timing is shifted to $IT_5'$ which is later than $IT_5$ (FIG. 5). The apparatus accomplishes this delay in ignition timing by causing the microcomputer circuit 121 to produce a signal to reduce the engine rotating speed to a value smaller than $N_5'$. An ignition timing control signal to delay the ignition timing (that is, change it from $IT_5$ to $IT_5'$) is then output from the distributing circuit 122 to the ignition circuit. If any one of the above conditions is not satisfied, the ignition timing is maintained at $IT_5$.

Using the waveforms associated with the output of the pulser coil 12 and the gate of the thyristor 53 (FIG. 4) as examples, the function of the distributing circuit 122 (FIG. 3) can be understood. In order to maintain the starting ignition timing $IT_6$, the output line of the distributing circuit 122 designated by the signal S2 (FIG. 3) must substantially block current flow into the circuit 122 to allow the positive-going output of the pulser coil 12 to switch on the thyristor 53. In order to change the ignition timing from $IT_6$ to one of the delayed ignition timing settings such as $IT_5$, the S2 output of the distributing circuit 122 must draw a large enough amount of current so that the positive-going output of the pulser coil 12 is prevented from switching on the thyristor 53, and thereafter the distributing circuit 122 must apply a pulse to the S2 output in order to switch on the thyristor 53 according to the delayed timing $IT_5$.

Although the case where the selecting position of the manual change-over switch 10 is set to $P_5$ has been described above, in the case where the selecting position of the manual change-over switch 10 is set to one of $P_4$ to $P_1$, the upper limit of the engine rotating speed in the neutral mode is similarly set to one of $N_4'$ to $N_1'$. If the engine rotating speed is higher than the limit value while the engine is in the idling mode, the ignition timing is shifted to one of $IT_4'$ to $IT_1'$ (corresponding respectively to the limit speeds $N_4'$ to $N_1'$), thereby enabling the engine rotating speed to be reduced.

When the throttle opening degree is increased and set to $\theta_1$ or more (taking the engine out of the idling mode), the throttle opening degree signal is input to the microcomputer circuit 121. The ignition timing is shifted while drawing a spark advance curve shown in FIG. 5. Then, the ignition timing is saturated at $IT_7$ and becomes a constant value.

A flow of the control system will now be described by a flowchart shown in FIG. 6. First, the engine is started. Next, if the throttle opening degree is $\theta_1$ or less in FIG. 5, the ignition timing is set to $IT_6$. If the engine is in the warming-up mode, it is held for the $T_2$ time. If the engine is in the cooling state, it is held for the $T_1$ time. When the throttle opening degree is greater than $\theta_1$ but is $\theta_2$ or less, the ignition timing is set to $IT_6$. Similarly, if the engine is in the warming-up state, it is held for the $T_2$ time. If the engine is in the cooling state, it is held for the $T_1$ time. After the engine was held, the ignition timing is set to a timing between $IT_5$ and $IT_6$ and, further, the engine is held until the throttle opening degree is set to $\theta_1$. On the other hand, when the throttle opening degree is more than $\theta_2$, the ignition timing is set to a value between $IT_6$ and $IT_7$ in correspondence to the throttle opening degree as shown in FIG. 5. Similarly, if the engine is in the warming-up state, it is held for the $T_2$ time. If the engine is in the cooling state, it is held for the $T_1$ time. Thereafter, the engine operates at the ignition timing according to the throttle opening degree until the throttle opening degree is set to $\theta_1$ or less.

When the throttle opening degree is set to $\theta_1$ or less, if the manual change-over switch is set to the position of $P_1$, if the gear is not connected and the engine rotating speed is set to $N_1'$ or more, the ignition timing is set to $IT_1'$. If the gear is connected or even if the gear is not connected, when the engine rotating speed is set to $N_1'$ or less, the ignition timing is set to $IT_1$.

In a manner similar to the above, when the position of the manual change-over switch is set to $P_2$, $P_3$, $P_4$, or $P_5$, the ignition timing also changes in accordance with the gear state and the engine rotating speed.

As described above, according to the invention, since the engine rotating speed measuring device and the ignition timing control circuit are provided, the engine rotating speed in the idling mode can be controlled by their operation. Therefore, during the transition from the idling mode to the trolling mode, the occurrence of damage to the clutch, engine stall, or the like can be reduced. Moreover, the error of the engine rotating speed which is caused upon mass production or when the engine is attached can be reduced. As mentioned above, the excellent idling rotating speed control system of the outboard engine which could not conventionally be obtained can now be provided.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an idling rotating speed control system for an outboard engine, including a throttle sensor to detect a throttle opening degree, a neutral switch having a mechanism which can be started only if a clutch is set to a neutral mode, a remote control box to execute opening and closing operations of the clutch and throttle, a manual change-over switch to select an ignition timing for a trolling mode, and an ignition circuit to send an ignition signal to an ignition coil, the improvement comprising rotating speed measuring means for measuring rotating speed of the engine, and an ignition timing control circuit to output an ignition timing control signal to the ignition circuit on the basis of the throttle opening degree, the engine rotating speed, and a gear position.

2. A rotational speed control system for an engine having a throttle which is openable and closeable for respectively increasing and decreasing the rotational speed of the engine, comprising:
   first detection means for determining whether the throttle is closed beyond a predetermined throttle position;

second detection means for determining whether the engine is mechanically loaded;

third detection means for determining whether the rotational speed of the engine exceeds a predetermined speed; and timing delay means responsive to said first, second and third detection means and operable when the throttle is closed beyond the predetermined position, the engine is not mechanically loaded, and the rotational speed of the engine exceeds the predetermined speed, for changing ignition timing of the engine from a first ignition timing setting to a second ignition timing setting, said second ignition timing setting being delayed from said first ignition timing setting.

3. The system of claim 2, wherein said second detection means includes gear engagement detection means for determining whether the engine is engaged with a drive gear.

4. The system of claim 2, wherein said third detection means includes a rotor having a magnet attached thereto and being rotatable synchronously with the rotation of the engine.

5. The system of claim 4, including a manual switch for selecting said first ignition timing setting from a plurality of predetermined ignition timing settings.

6. The system of claim 5, including starting timing means for maintaining a start-up ignition timing for a predetermined time period after the engine has started, said timing delay means being operable only after said predetermined time.

* * * * *